(12) United States Patent
Nelson

(10) Patent No.: US 8,109,552 B2
(45) Date of Patent: Feb. 7, 2012

(54) TRUCK BED EXTENDER

(76) Inventor: Charles R. Nelson, La Pointe, WI (US)

( * ) Notice: Subject to any disclaimer, the term of this patent is extended or adjusted under 35 U.S.C. 154(b) by 52 days.

(21) Appl. No.: 12/310,878

(22) PCT Filed: Sep. 13, 2007

(86) PCT No.: PCT/US2007/019820
§ 371 (c)(1),
(2), (4) Date: Mar. 11, 2009

(87) PCT Pub. No.: WO2008/042085
PCT Pub. Date: Apr. 10, 2008

(65) Prior Publication Data
US 2009/0309381 A1 Dec. 17, 2009

(51) Int. Cl.
*B62D 33/037* (2006.01)
*B62C 1/06* (2006.01)
*B60R 9/06* (2006.01)

(52) U.S. Cl. .......... 296/26.11; 224/403; 296/37.6; 296/57.1

(58) Field of Classification Search .......... 16/366, 16/368, 369; 224/402, 403, 404; 296/26.08, 296/26.11, 37.6, 50, 51, 57.1
See application file for complete search history.

(56) References Cited

U.S. PATENT DOCUMENTS

| | | | |
|---|---|---|---|
| 4,132,444 A | 1/1979 | Beggs | |
| 4,283,083 A * | 8/1981 | Johnson | 296/37.1 |
| 4,531,773 A * | 7/1985 | Smith | 296/26.11 |
| 5,154,470 A * | 10/1992 | Bringman, Jr. | 296/26.11 |
| 5,340,004 A * | 8/1994 | Moore | 224/563 |
| 5,368,210 A * | 11/1994 | Wotring | 224/404 |
| 5,468,038 A * | 11/1995 | Sauri | 296/57.1 |
| 5,628,442 A * | 5/1997 | Wayne | 224/543 |
| 5,700,047 A * | 12/1997 | Leitner et al. | 296/26.11 |
| 5,741,039 A * | 4/1998 | Habdas | 296/57.1 |
| 5,752,800 A * | 5/1998 | Brincks et al. | 414/537 |
| 5,755,480 A * | 5/1998 | Bryan | 296/26.01 |
| 5,765,892 A | 6/1998 | Covington | |
| 5,775,759 A * | 7/1998 | Cummins | 296/26.11 |
| 5,788,311 A * | 8/1998 | Tibbals | 296/62 |
| 5,806,907 A * | 9/1998 | Martinus et al. | 296/26.11 |
| 5,816,638 A * | 10/1998 | Pool, III | 296/26.11 |
| 5,820,188 A * | 10/1998 | Nash | 296/26.11 |
| 5,823,596 A * | 10/1998 | Kulesza | 296/26.08 |
| 5,857,724 A * | 1/1999 | Jarman | 296/26.11 |
| 5,868,295 A * | 2/1999 | Carriere | 224/404 |
| 5,997,066 A * | 12/1999 | Scott | 296/26.08 |
| 6,155,622 A * | 12/2000 | Reed | 296/26.08 |
| 6,179,360 B1 * | 1/2001 | Davian | 296/50 |
| 6,193,294 B1 * | 2/2001 | Disner et al. | 296/26.11 |
| 6,227,593 B1 | 5/2001 | DeValcourt | |

(Continued)

*Primary Examiner* — Glenn Dayoan
*Assistant Examiner* — Paul Chenevert
(74) *Attorney, Agent, or Firm* — Richard C. Litman

(57) ABSTRACT

The truck bed extender (10) has three panels (12, 26a, 26b) removably attached to the edge of the vehicle tailgate (G) and the rear portions (LR, RR) of the cargo box sidewalls (LW, RW). The deployed extender (10) increases the vehicle capacity and efficiency. The side panels (26a, 26b) fold against the inner surface of the primary panel (12) and the primary panel (12) folds against the inner surface of the tailgate (G) for compact storage of the assembly. The panel assembly (10) may be quickly and easily removed from the permanently installed hinges (14a, 14b) on the vehicle tailgate (G). The extender assembly (10) may be deployed, stored, removed, and installed without tools, once the primary panel hinges (14a, 14b) and side panel attachment brackets have been installed on the vehicle.

12 Claims, 15 Drawing Sheets

U.S. PATENT DOCUMENTS

| | | | |
|---|---|---|---|
| 6,257,637 B1 * | 7/2001 | Reed ........................ 296/26.08 |
| 6,334,562 B1 * | 1/2002 | Ament et al. ................ 224/563 |
| 6,340,190 B1 | 1/2002 | Rosebrugh et al. |
| 6,378,926 B1 | 4/2002 | Renze et al. |
| 6,422,627 B1 | 7/2002 | Kuhn et al. |
| 6,422,630 B1 | 7/2002 | Heaviside |
| 0,127,873 A1 | 7/2003 | Reed |
| 6,631,938 B1 * | 10/2003 | Burns ............................ 296/64 |
| 6,676,182 B2 | 1/2004 | Fitts |
| 6,746,066 B2 * | 6/2004 | Reed ........................ 296/26.08 |
| D501,443 S * | 2/2005 | Jones et al. .................. D12/414 |
| D504,384 S * | 4/2005 | Straschewski ............... D12/414 |
| 6,908,134 B1 * | 6/2005 | Summers ................... 296/26.11 |
| 6,994,389 B1 | 2/2006 | Graffy et al. |
| 7,040,683 B1 | 5/2006 | Beach |
| 7,070,220 B1 | 7/2006 | Lantaigne |
| 7,104,582 B2 | 9/2006 | Morrison |
| 7,111,886 B1 | 9/2006 | Miller et al. |
| 7,121,607 B2 | 10/2006 | Bauer |
| 7,175,218 B1 | 2/2007 | Keene |
| 7,204,537 B1 | 4/2007 | Oh et al. |
| D541,729 S | 5/2007 | French |
| 7,226,100 B1 | 6/2007 | Willey et al. |
| D551,155 S | 9/2007 | French |
| 7,264,292 B1 * | 9/2007 | Summers ................... 296/26.11 |
| 7,287,798 B2 | 10/2007 | King |
| 7,571,947 B2 * | 8/2009 | Hawley ...................... 296/26.11 |
| 7,654,599 B2 * | 2/2010 | Stewart et al. ............. 296/26.11 |
| 2002/0006317 A1 * | 1/2002 | Hofmann et al. ................ 410/96 |
| 2004/0094589 A1 * | 5/2004 | Fricano ........................ 224/404 |
| 2006/0214449 A1 | 9/2006 | Klusmeier |
| 2007/0236034 A1 | 10/2007 | Stewart et al. |
| 2007/0284904 A1 | 12/2007 | Carvalho |
| 2008/0217944 A1 * | 9/2008 | Wood et al. ................. 296/26.11 |
| 2008/0231067 A1 * | 9/2008 | Nagle ............................. 296/50 |
| 2010/0026027 A1 * | 2/2010 | Gao .......................... 296/26.11 |

* cited by examiner

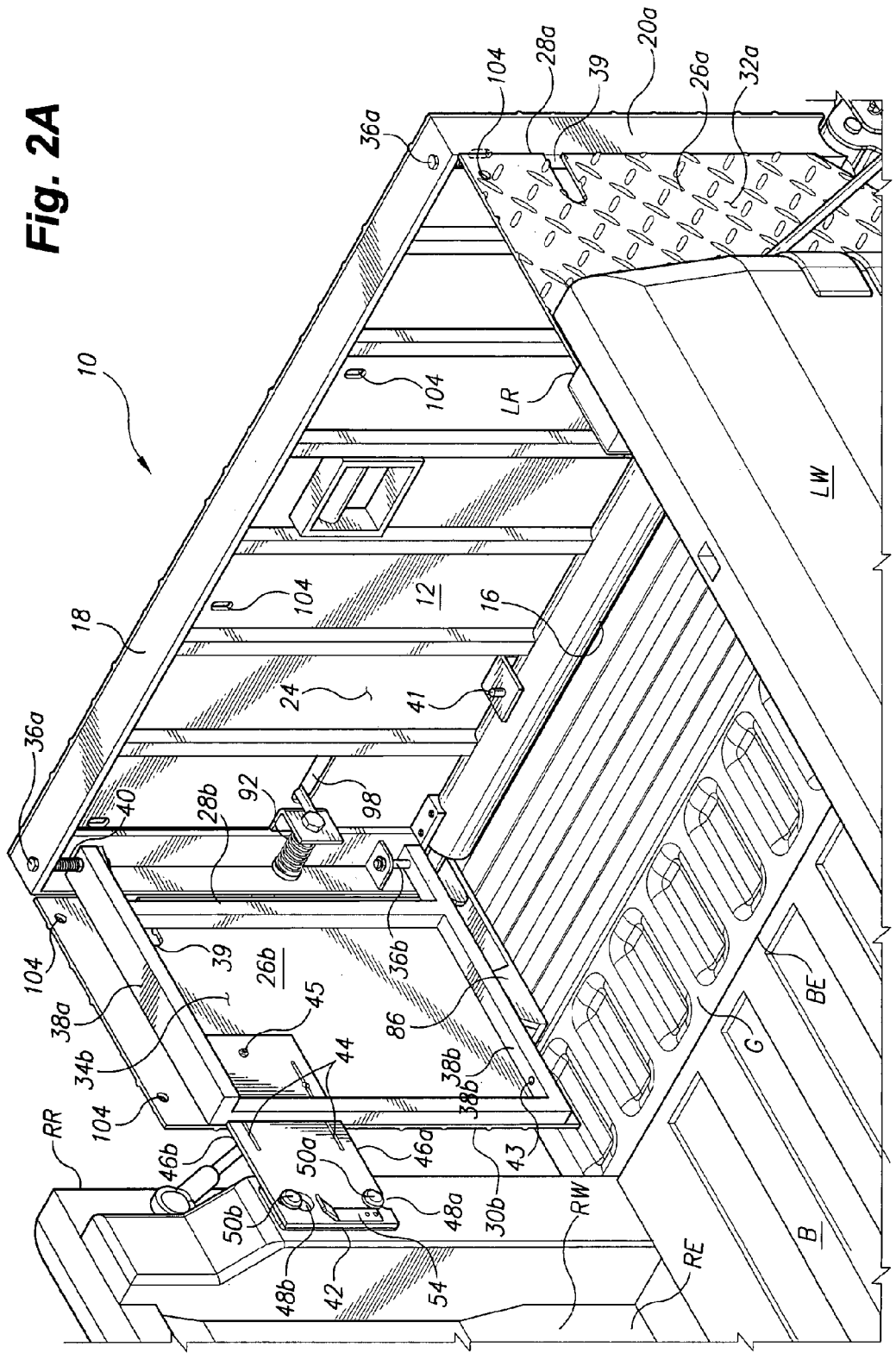

TRUCK BED EXTENDER

TECHNICAL FIELD

The present invention relates generally to attachments and accessories for motor vehicles. More specifically, the present invention relates to a truck bed extender for the bed of a pickup truck, sport utility vehicle, or the like, which provides an elongated bed and rearwardly displaced extension gate for the vehicle when installed.

BACKGROUND ART

Utility vehicles and light trucks, such as pickup trucks and sport utility vehicles, have become increasingly popular. One of the most important reasons for this popularity is the ability of such a vehicle to carry a considerable amount of cargo for its size. An often cited benchmark of the cargo capacity of such vehicles is the ability to carry a four-foot wide by eight-foot long sheet of paneling flat in the bed of the vehicle, with the rear gate in its upright position. However, the dimensional carrying capacity of such vehicles is limited by the external size of the vehicle, and many people prefer to own and operate vehicles of smaller size and lighter weight in order to enjoy less costly purchase price, insurance, and fuel costs. The configuration of many pickup trucks also limits the size of the bed, with extended cab pickups becoming more and more popular, along with the addition of various accessories (cross-bed tool boxes, etc.), which limit the capacity of the cargo bed of such vehicles. The reduction of bed length in extended cab pickups and the installation of cross-bed toolboxes generally reduce the bed length of even full-size pickup trucks to less than eight feet in length.

Many pickup trucks are now light duty, compact trucks designed to provide relatively low fuel consumption while providing the convenience of a cargo bed. Such trucks often have a standard bed that is on the order of five feet in length. In addition, toolboxes that can be bolted to the truck bed are a common accessory for pickup trucks. Such toolboxes are available in models that extend across the bed directly behind the cab, or that are mounted adjacent the wheel wells, and offer secure storage for tools, but diminish part of the cargo-carrying capacity of the truck bed. Another adverse effect produced by relatively short cargo beds is the difficulty in carrying articles of extended length that rest upon the edge of the tailgate, e.g., ladders and the like. In a vehicle having a cargo bed length of only five feet or less, a longer article must rest atop the edge of the tailgate when the gate is closed. The upper edge of the gate thus becomes a fulcrum for the article. If the article is longer than twice the length of the cargo bed, it is overbalanced beyond the back of the vehicle and tailgate, and must be positively secured somewhere and somehow in the cargo bed of the vehicle. In order to compensate for the sometimes short length of the truck bed or the space occupied by permanently mounted toolboxes, it becomes necessary to extend the length of the truck bed. While many such devices have been proposed, none have proven entirely satisfactory.

Thus, a truck bed extender solving the above noted problems is desired.

DISCLOSURE OF INVENTION

The disclosure is directed to a truck bed extender. Left and right hinge bracket assemblies are attached to the bed gate (i.e. tailgate) of a truck. An extender primary panel is pivotally and removably attached to the hinge brackets. Left and right side panels are attached to the left and right edges of the primary panel. Left and right sidewall latch plates are attached to and extend from the left and right side panels. Left and right latch assemblies extend from the left and right sidewalls of the truck bed.

In operation, the truck bed extender primary panel extends from a truck tailgate. The primary panel can be raised and lowered by pivoting the primary panel about the hinge brackets so that the is the left and right latch plates attached to the primary panel selectively engage and disengage the left and right sidewall latch assemblies attached to the truck bed sidewalls.

BRIEF DESCRIPTION OF THE DRAWINGS

FIG. 2A is an environmental perspective view of the truck bed extender of FIG. 1, showing the interior of the rear portion of the pickup truck cargo bed with the truck bed extender deployed, showing further details thereof.

Similar reference characters denote corresponding features consistently throughout the attached drawings.

BEST MODES FOR CARRYING OUT THE INVENTION

The truck bed extender has a hinged primary panel, which is removably secured to the inner surface of the conventional tailgate at its corners opposite the conventional tailgate hinges. The extender hinge brackets are permanently secured to the vehicle tailgate. The primary panel thus hinges or pivots from a stored position adjacent and parallel to the inner surface of the tailgate to a first deployed position normal to the gate. A latch is provided to secure the extender in its stored position adjacent the inner surface of the gate when the extender is not needed. First and second extender end panels fold outwardly from the inner surface of the primary panel and removably attach to end panel attachment brackets permanently installed to the rear portions of the left and right truck box walls. Thus, the primary panel and the two end panels define a cargo box extension for the vehicle when the panels are deployed.

The primary panel hinges may include double pivots for articulation of the primary panel to extend downwardly beyond the plane of the lowered tailgate of the vehicle in order to facilitate the loading of cargo directly over the inner surface of the lowered tailgate and obviate the need to lift or move such cargo over the additional height or thickness of the folded extender disposed adjacent the inner surface of the tailgate. The primary panel may be held in place between the hinges until the panel is rotated or pivoted to a predetermined angle relative to the gate, at which time the panel may be moved axially along the hinge line to overcome the pressure of a biasing spring to allow the hinge pins of the extender to be removed from the hinge brackets. The side panels are also urged to their latched positions by axial springs disposed upon their hinge pins in order to retain the side panels in their latched positions on the vehicle bed wall latch plates when the extender is deployed. Additional accessories may be provided, e.g., a storage container removably secured to the extender main panel and/or side panels when the extender is deployed or erected.

Figure 1:
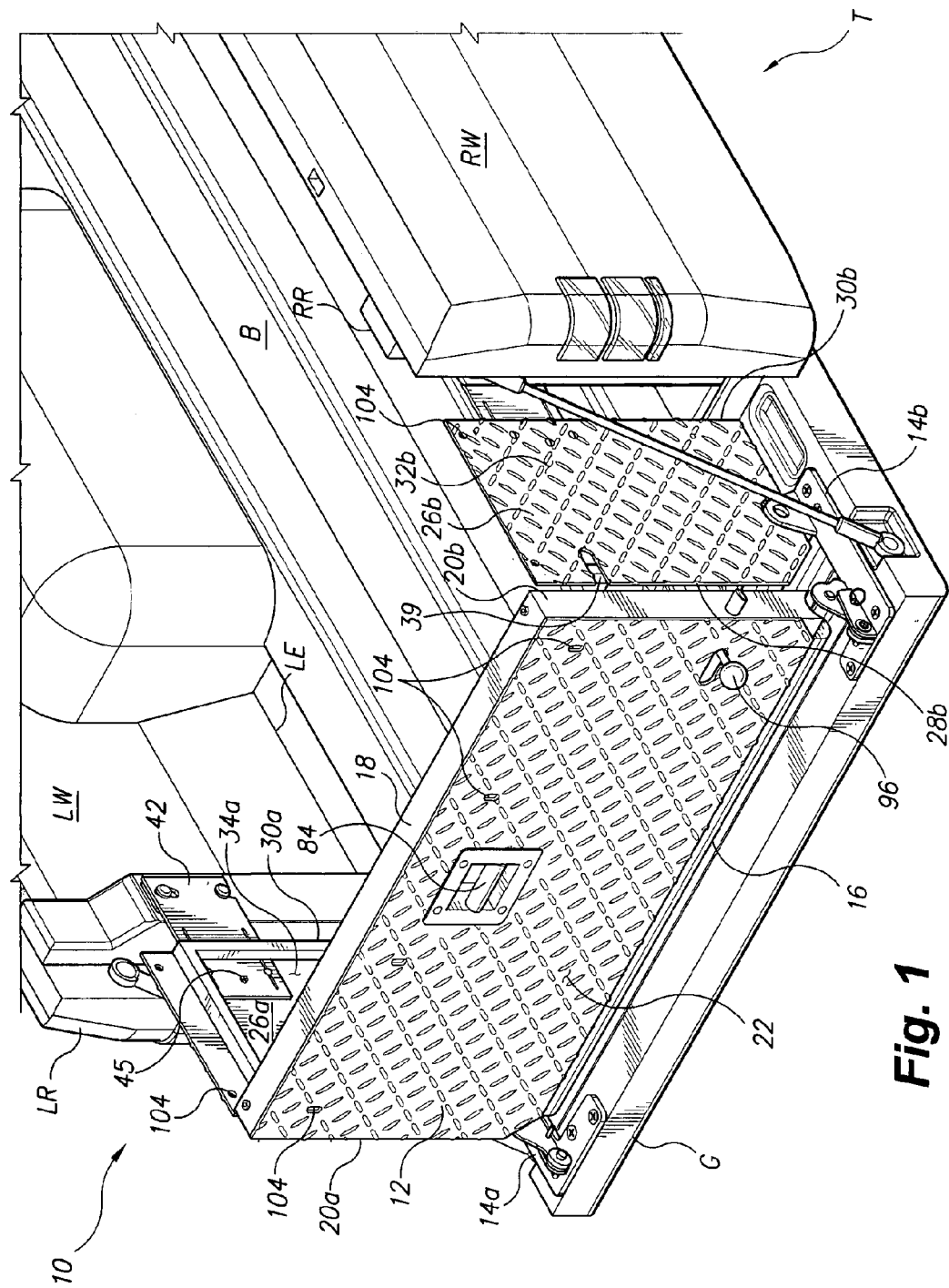
FIG. 1 is an environmental right rear perspective view of a truck bed extender according to the present invention, showing the rear portion of a pickup truck cargo bed and tailgate and the truck bed extender deployed thereon.

FIG. 1 of the drawings is a right rear perspective view of the extender assembly 10 in its deployed configuration, extending from the cargo bed B of a pickup truck T. The truck T is generally conventional, with the bed B having left and right lateral edges LE and RE (the right edge RE being visible in FIGS. 2A, 2B, 7, and 11) and a rearward edge or bed end BE (shown in FIGS. 2A, 2B, 3 through 7, and 11), with opposite left and right sidewalls LW and RW extending upwardly from the respective left and right edges LE and RE of the bed B. A tailgate G is pivotally attached to the rearward bed end BE of the bed B and latches to the rearward ends LR and RR of the two sidewalls LW and RW in its closed or upright position. The tailgate G can be unlatched and pivoted downwardly to a generally coplanar disposition with the truck bed B, where it is restrained by cables, chains, etc., generally as shown in FIGS. 1 through 6 of the drawings. The above-described cargo vehicle configuration is also true of many closed vehicles, e.g., light panel trucks, sport utility vehicles, station wagons, etc. having horizontally hinged tailgates, with the present bed extender being adaptable to such vehicles in addition to pickup trucks.

The truck bed extender 10 has three panels that are pivotally attached to one another, with the primary panel 12 being pivotally (but removably) attached to the tailgate G. This is accomplished by mutually opposed left and right hinge bracket assemblies 14a and 14b, which are permanently attached (i.e., screwed or bolted in place, or alternatively riveted or welded, as desired) to the opposite left and right edges of the tailgate G. The primary panel 12 is pivotally secured therebetween. The hinge bracket assemblies 14a and 14b preferably include double pivots for articulation of the primary panel 12, with detailed illustrations of the exemplary right hinge 14b being provided in FIGS. 8 through 10 and discussed further below. The extender primary panel 12 includes a hinge attachment edge 16, which spans the distance between the two hinge assemblies 14a and 14b; a distal edge 18 opposite the hinge attachment edge 16; mutually opposed left and right edges 20a and 20b; an outer surface 22; and an opposite inner surface 24.

Left and right extender side panels 26a and 26b are pivotally attached to the respective left and right edges 20a and 20b of the primary panel 12, Each of the side panels 26a and 26b includes a primary panel attachment edge 28a, 28b; a distal edge 30a, 30b opposite their primary panel attachment edges; an outer surface 32a and 32b; and an inner surface 34a and 34b opposite their outer surfaces. Each of the panels 12, 26a, and 26b is preferably formed as a rigid construction, with a rigid metal frame (e.g., square or round steel or aluminum tube or angle, etc.) and suitable paneling (e.g., "diamond plate" aluminum sheet, galvanized steel, expanded metal or screen, etc.) secured to the frame. Alternatively, the panels 12, 26a, and 26b might be stamped of sheet metal or cast or molded of plastic material or other suitable material.

FIG. 2A shows a first embodiment of a hinge mechanism for attaching the side panels 26a and 26b to the primary panel 12, and a corresponding latch mechanism for latching the side panels 26a and 26b to the left sidewall LW and right sidewall RW of the truck bed B. FIG. 2A shows only the right side hinge and latch, the left side being symmetrical. As shown in FIG. 2A, the right side panel 26b is pivotally attached to the primary panel 12 by an upper pivot pin 36a and a lower pivot pin 36b. Side panel 26b is slidable upward and downward in pivot pins 36a and 36b. A bias spring 40 is coaxially mounted on upper pivot pin and is constrained at the top of the spring 40 by edge 18 and at the bottom of the spring by an upper frame member 38a of the side panel 26b. Spring 40 is, e.g., a helical compression spring and biases the side panel downward. When it is desired to pivot the side panel 26b, the side panel is lifted, e.g., by grasping upper frame member 38a by means of the handgrip passage 39 provided in each of the panels 26a, 26b adjacent their respective upper frame members and pulling upward, compressing bias spring 40 and raising lower frame member 38b above the bottom frame of primary panel 12 so that side panel 26b may be pivoted inward until it is parallel with primary panel 12.

A retaining pin 41 is installed to the inside of the primary panel 12 to each side of the center thereof The two retaining pins 41 engage corresponding holes or passages 43 formed in the lower components of the two side panel frame members 38a and 38b when the side panels 26a and 26b are folded to their stowed positions against the inside of the primary panel 12 and urged downwardly by the spring 40. The retaining pin passage 43 is shown extending completely through the side panel frame lower component in FIGS. 2A and 2B for clarity in the drawings. However, it need only be provided in the underside of the side panel frame lower component to engage the relatively short retaining pin 41.

A latch plate 42 extends forward from the side panel 26b. Latch panel or plate 42 has an open keyhole slot 48a extending into the plate 42 from the lower edge 46a of the plate 42, i.e., a semicircular cutout in the bottom plate with a longitudinal slot extending upward towards the center of the plate 42, as seen more clearly in FIG. 3. Latch panel has a closed keyhole slot 48b aligned with the open keyhole slot 48a higher up on the latch plate 42. Latch pins 50a and 50b extend from the right sidewall RW of the truck bed B, or from a latch pin mounting plates 52a and 52b (seen in FIG. 3) attached to the sidewall of the truck bed B. In use, the side panel 26b is raised to align the head of the latch pins 50a and 50b with the semicircular or circular portions of the keyhole slots 48a and 48b to permit pivoting the side panel 26b towards or away from the sidewall RW. The side panel 26b is lowered by bias spring 40 to allow the shaft of the latch pins 50a and 50b to slide in the narrow linear portion of the keyhole slots 48a and 48b as the latch plate slides downward with side panel 26b. Latch plate 42 may have slots 44 defined therein for aligning latch pins 50a and 50b with keyhole slots 48a and 48b during installation. The latch plates 42 are positioned as required during initial installation to place the keyhole slots 48a, 48b over their corresponding latch pins 50a, 50b, and fasteners (nuts and bolts, rivets, etc.) are secured through passages in the latch plates 42 and slots 44 to lock the latch plates 42 in their operating positions. An additional lock fastener assembly 45 (nut and bolt, etc.) may be installed through each of the latch plates 42 and corresponding extender side panels 26a, 26b to assure that the latch plates 42 will not slip out of adjustment. A symmetrical hinge and latch structure attaches the left side panel 26a to the primary panel 12 and latches the side panel 26a to left sidewall LW.

Figure 2B:
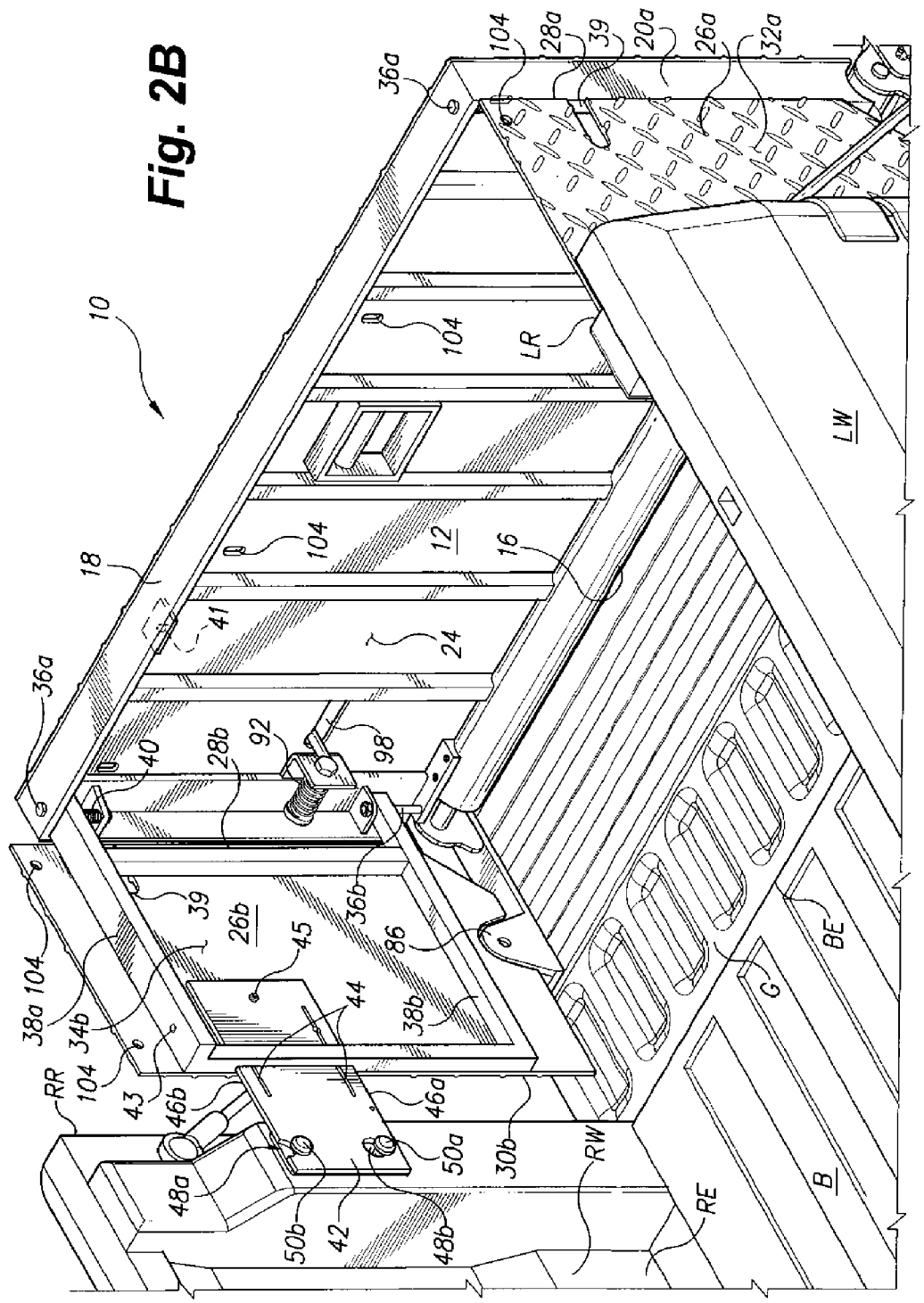
FIG. 2B is an environmental perspective view of a truck bed extender according to the present invention similar to FIG. 2A, showing the interior of the rear portion of the pickup truck cargo bed with the truck bed extender deployed and showing details of an alternative side panel hinge and latch configuration from that shown in FIG. 2A.

FIG. 2B shows an alternative embodiment of the side panel hinges and latches in which bias spring 40 is mounted below upper frame member 38a of side panel 26b, being constrained between frame member 38a and a stop plate below the upper frame member 38a. This biases side panel 26b upward, so that side panel 26b must be pushed downwards to permit pivoting the side panel 26b. Latch plate 42 is positioned upside down relative to FIG. 2A, the bottom edge 46a in FIG. 2A being the top edge in FIG. 2B and the top edge 46b of FIG. 2A being the bottom edge in FIG. 2B. This reverses the orientation of the keyhole slots 48a and 48b, so that the Linear portions of the keyhole slots 48a and 48b are oriented downward in FIG. 2B. This assures that as the lowered tailgate G and the assembly comprising the primary panel 12, left and right extender side panels 26a, 26b, and their latch plates 42 are jounced upwardly due to surface irregularities as the vehicle is in motion, the lower, narrower slots of the keyhole passages 48a and 48b are forced more tightly onto the shanks of their corresponding engagement pins 50a, 50b to assure that the latch plates 42 cannot be jarred loose.

A lock 54, comprising a flexible spring metal component having a base end immovably attached to the latch plate 42 and an opposite distal handle end, may be installed upon either or both of the latch plates 42 for greater security of the assembly, if so desired. The lock 54 includes an outwardly protruding pin (not shown), which engages a hole (not shown) through the latch plate 42 and latch pin mounting plate 52a and/or 52b. This lock 54 prevents the latch plate 42 from moving upwardly if the vehicle tailgate G bounces upwardly due to travel over a rough surface or the like, which might otherwise jar the side panels 26a, 26b upwardly against their spring detents 40 and cause the latch plates 42 to come loose from their engagement pins 50a and 50b. The lock 54 is preferably installed upon only one of the latch plates 42 for convenience when folding or removing the extender assembly 10, but may be installed upon both latch plates if so desired. The lock 54 is illustrated in the configuration of FIG. 2A, as this is the configuration most prone to bouncing loose during travel. However, it will be seen that the lock 54 could be installed with the extender side panel configuration of FIG. 2B as well, if so desired.

Figure 3:
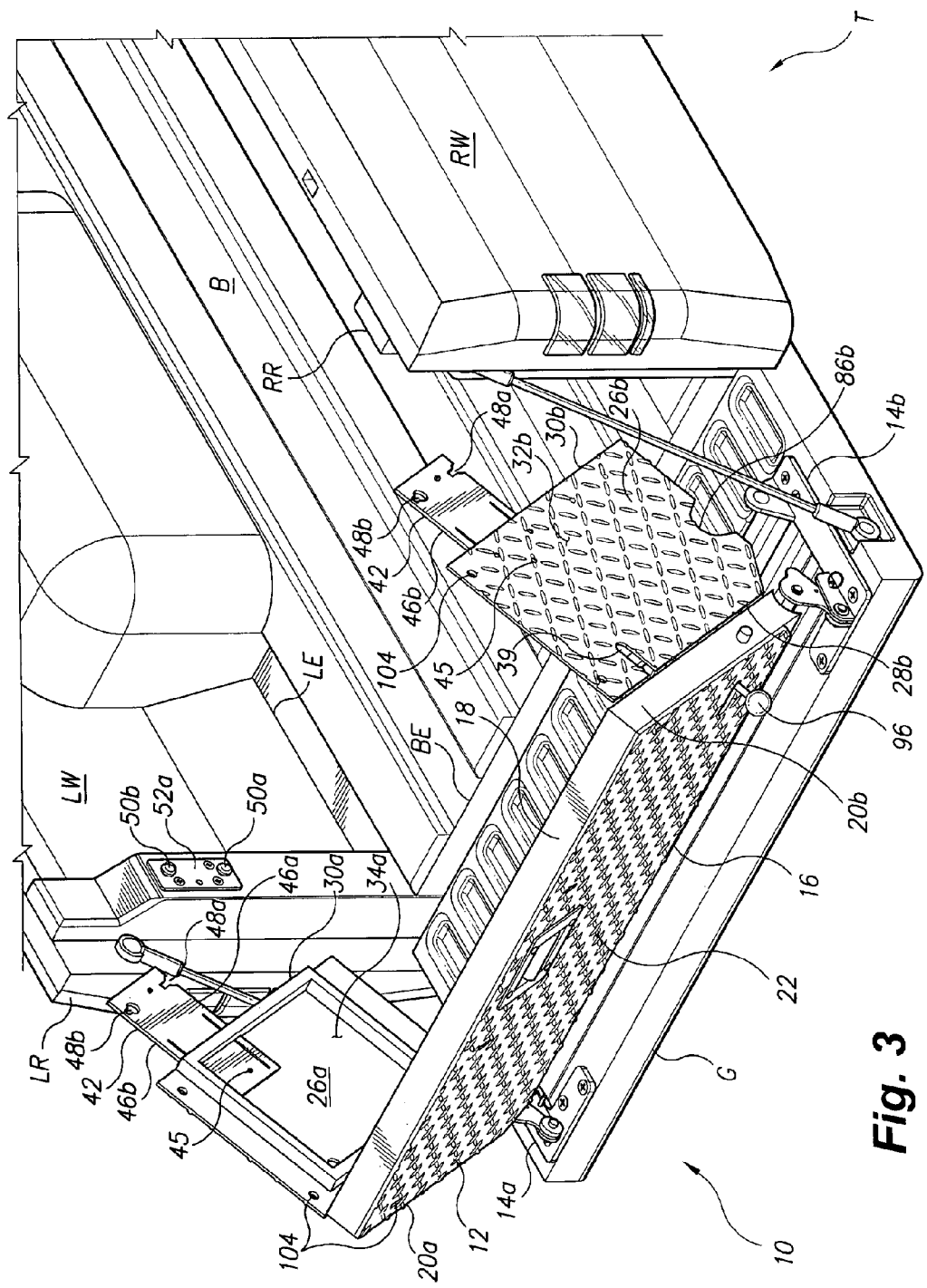
FIG. 3 is an environmental right rear perspective view of a truck bed extender according to the present invention, showing the rear portion of a pickup truck bed and the truck bed extender in an intermediate stage of deployment or storage.

FIGS. 3 through 7 illustrate the various configurations of the extender assembly 10 during folding and other operations. In FIG. 3, the truck bed extender 10 of the configuration of FIG. 2A is shown with the latch plates 42 disengaged from their corresponding engagement pins 50a, 50b and latch pin mounting plates 52a, 52b. The primary panel 12 and its two extender side panels 26a and 26b have been rotated rearwardly about the hinge line of the primary panel 12. The two side panels 26a and 26b are shown substantially normal to the plane of the primary panel 12.

Figure 4:
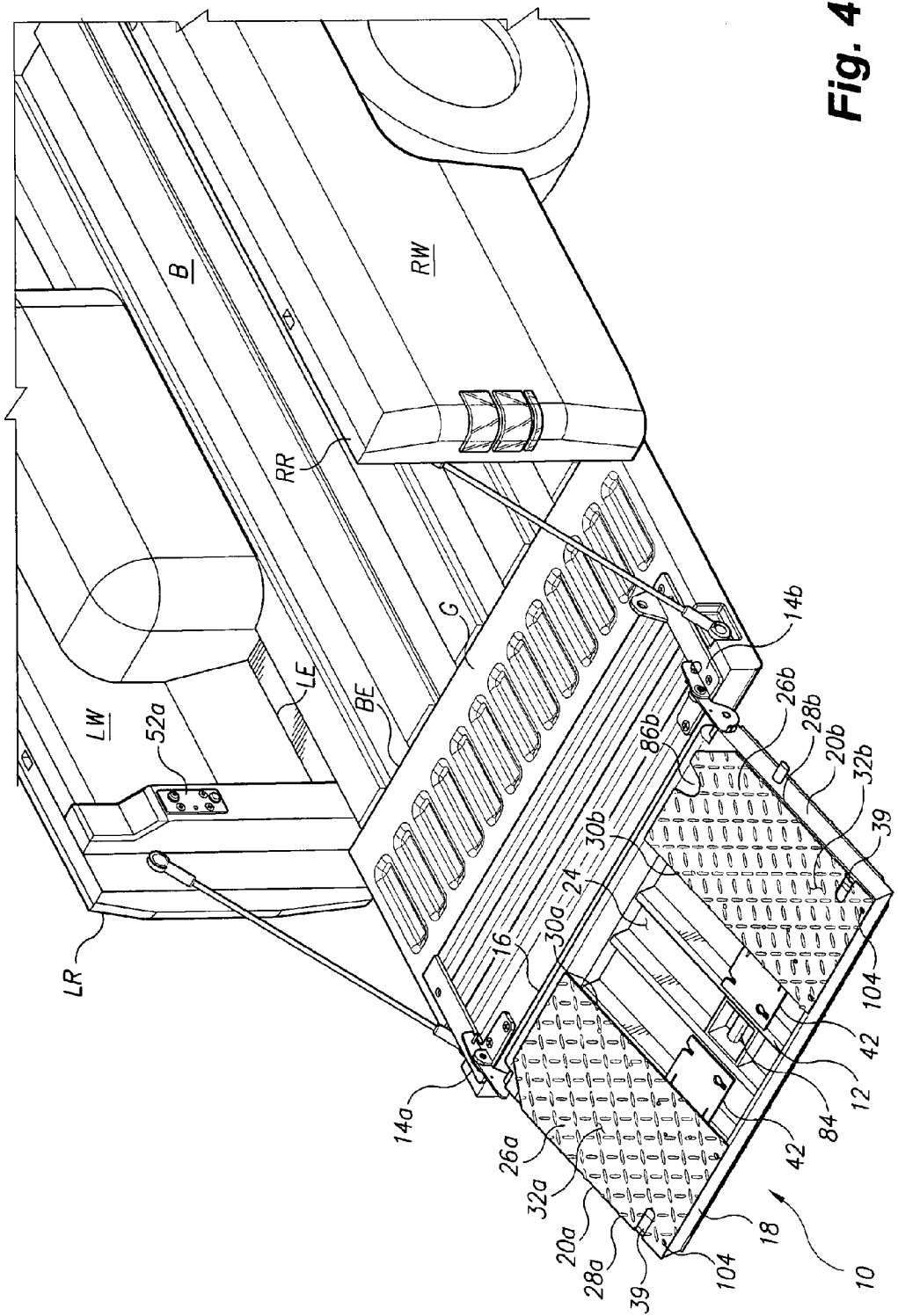
FIG. 4 is an environmental right rear perspective view of the rear portion of the pickup truck bed with its gate extended, showing the articulation of the truck bed extender of the present invention with the primary panel and its folded end panels beyond the plane of the extended gate.

FIG. 4 shows a further configuration of the extender assembly 10, in which the extender primary panel 12 has been rotated further rearwardly to an orientation substantially coplanar with the plane of the tailgate G. It will be noted that the two extender side panels 26a and 26b have been pivoted or folded inwardly to lie adjacent the inner surface 24 of the primary panel 12, and latched in place by means of the retaining pin 41 and retaining hole or passage 43 shown in FIGS. 2A and 2B. This provides a relatively thin folded structure, permitting the folded panel assembly to be stored compactly immediately adjacent the inner surface of the vehicle tailgate G with a minimal loss of cargo volume, generally as shown in FIGS. 6 and 7 of the drawings.

Figure 5:
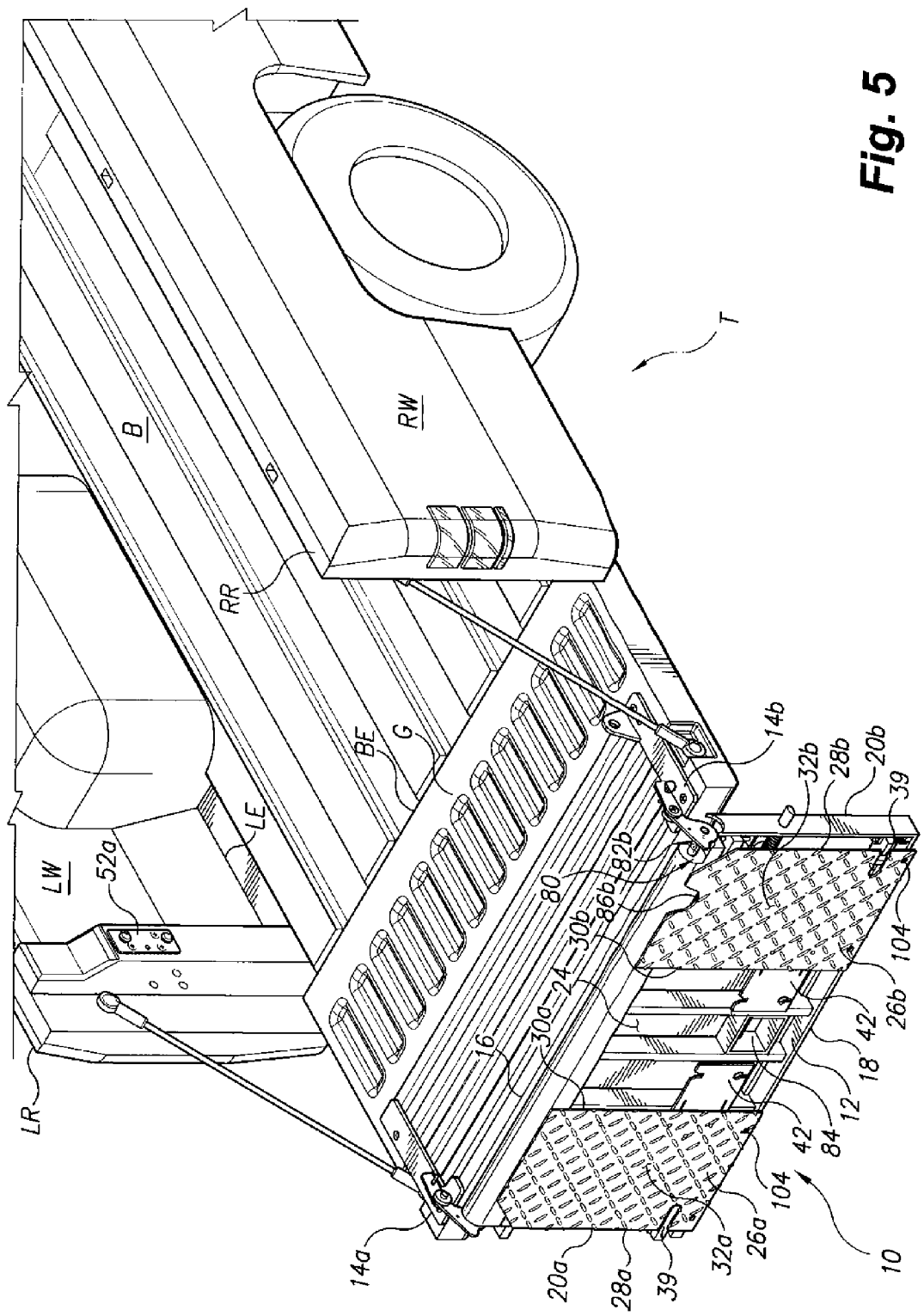
FIG. 5 is an environmental right rear perspective view of a truck bed extender of the present invention with the primary panel and folded rear panels in their fully extended position, suspended from the extended gate of the vehicle.

The articulating hinges 14a and 14b that attach the primary panel 12 to the vehicle tailgate G also permit the primary panel 12 (and its two attached side panels 26a, 26b) to pivot downwardly beyond the plane of the extended tailgate G, generally as shown in FIG. 5 of the drawings. This facilitates the loading or unloading of cargo from the bed B of the vehicle, by reducing the rearward span or extension of the tailgate G and attached extender assembly 10. The extender assembly may also be used as a supplemental ramp for loading and unloading cargo in this configuration, if so desired.

Figure 6:
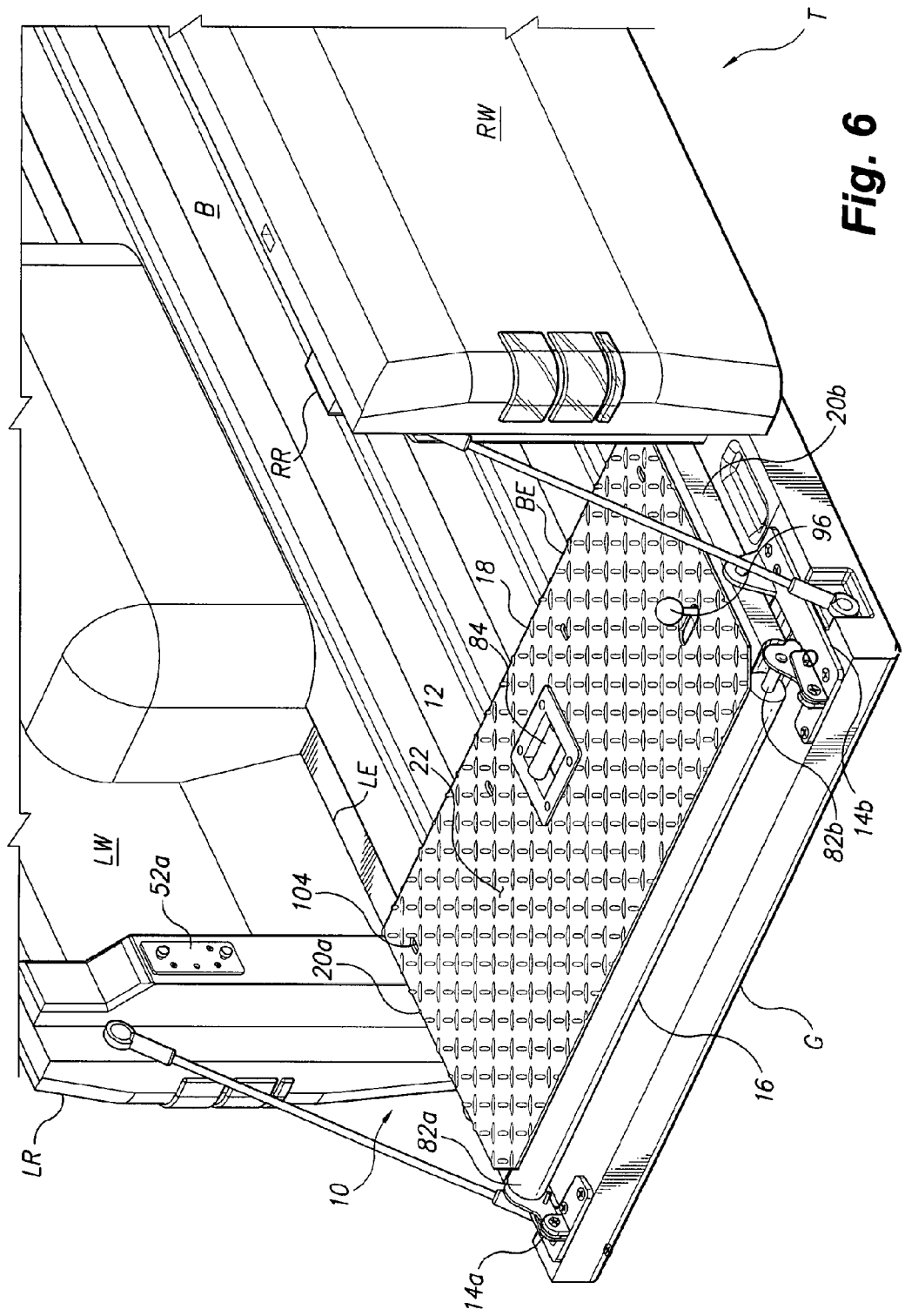
FIG. 6 is an environmental right rear perspective view of a truck bed extender of the present invention with the extender primary panel folded to lie adjacent to the inner surface of the lowered tailgate of the vehicle for storage of the extender.

FIG. 6 shows the extender 10 with the primary panel 12 and side panels 26a, 26b pivoted upwardly and forwardly to lie immediately atop the inner surface of the vehicle tailgate G. This configuration also facilitates the loading and unloading of cargo across the horizontally disposed gate G, due to the relatively thin structure of the folded primary panel 12 and its side panels 26a, 26b captured between the primary panel 12 and the tailgate G.

Figure 7:
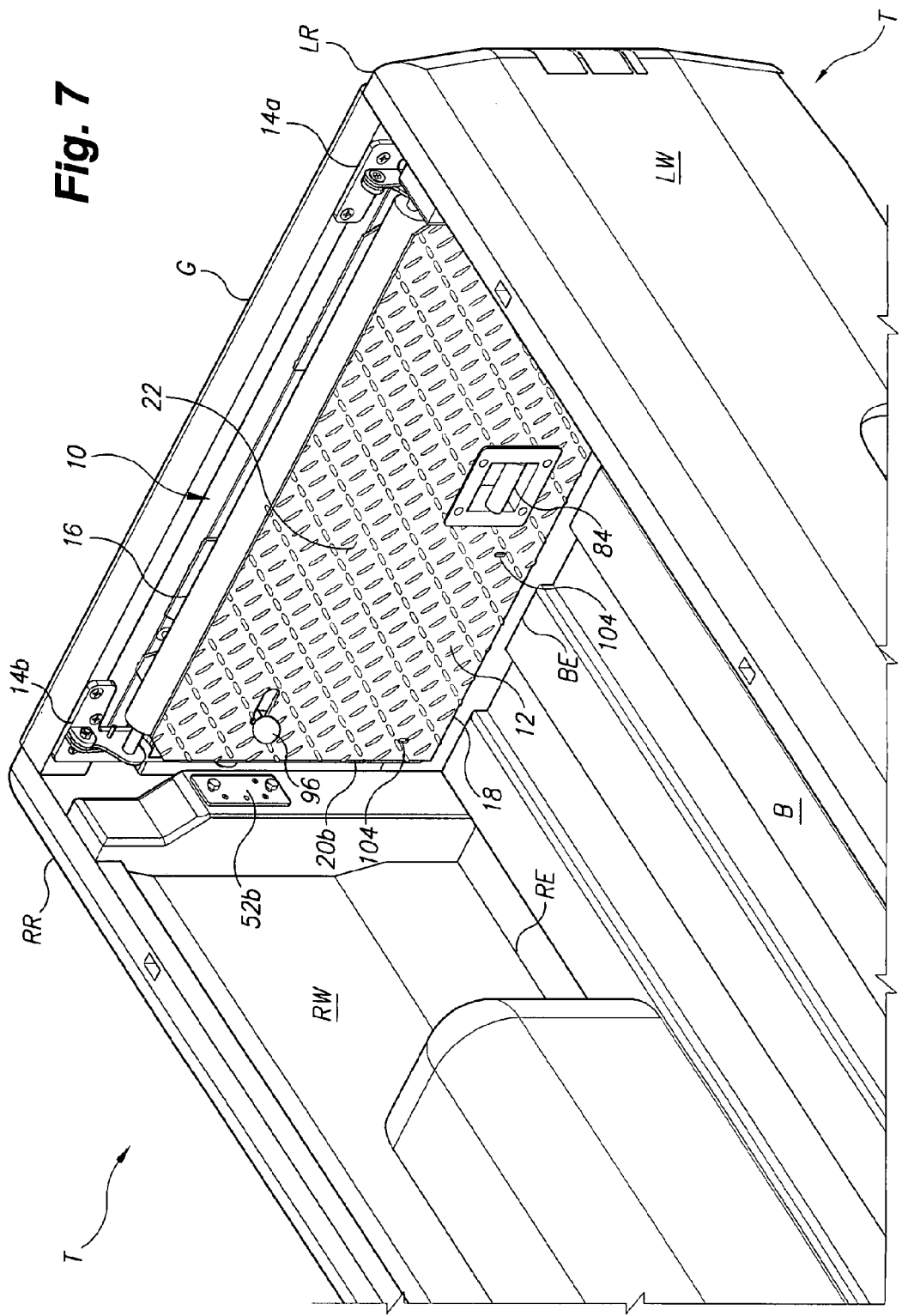
FIG. 7 is an environmental left rear perspective view of the interior of the vehicle cargo bed with the vehicle tailgate raised and the truck bed extender of the present invention stored thereagainst.

In FIG. 7, the tailgate G, with the extender 10 folded against the gate G has been raised to its closed and latched position against the rear portions LR and RR of the vehicle cargo box sidewalls LW and RW. As noted further above, the folded extender 10 has a relatively small thickness, e.g., on the order of two inches or so, and thus requires very little room in the back of the cargo bed B of the truck or vehicle T.

Figure 8:
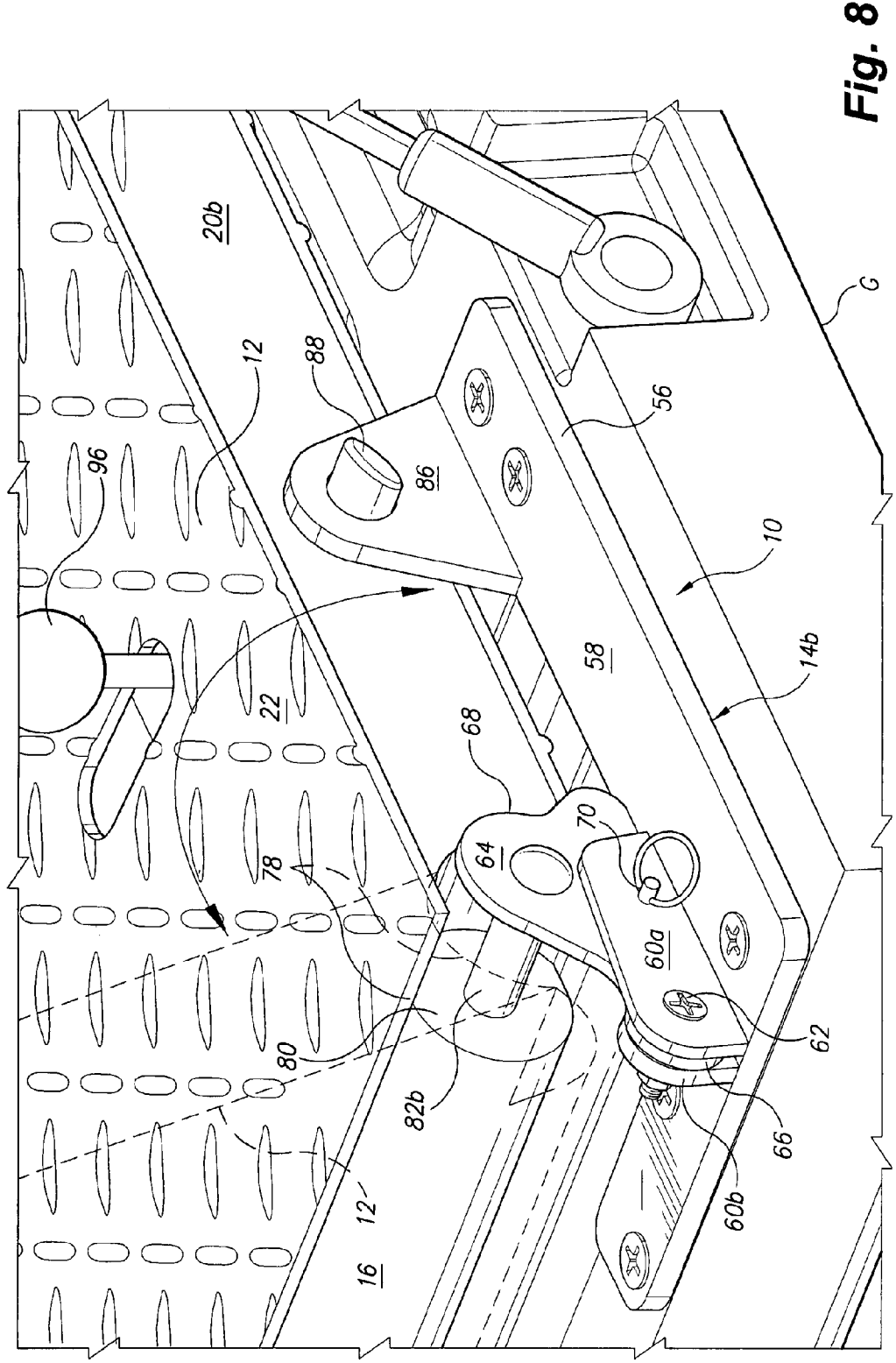
FIG. 8 is an environmental detail perspective view of a truck bed extender of the present invention, showing the right side primary panel hinge assembly, its two pivots, and the articulating mechanism.
Figure 9A:
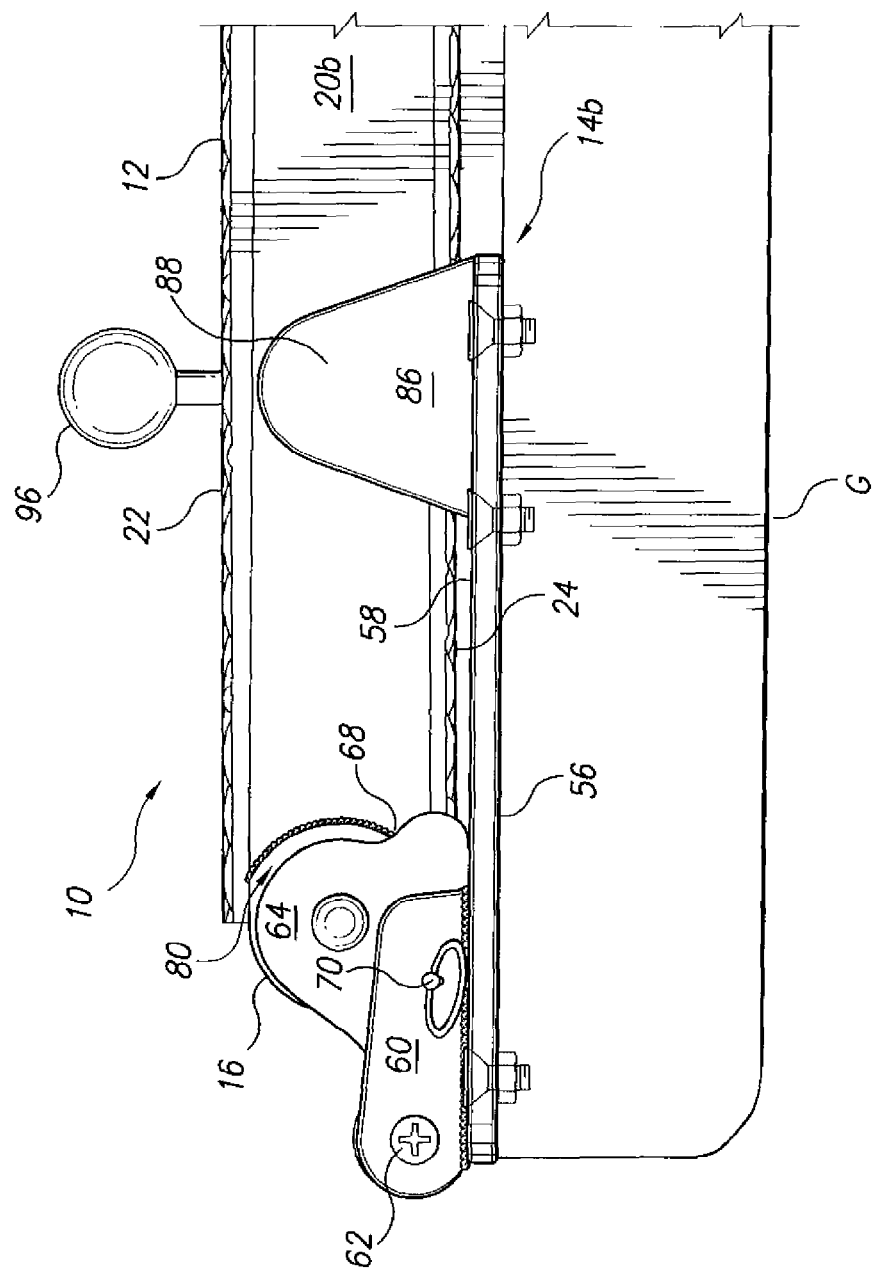
FIG. 9A is an environmental detailed elevation view of the right side primary panel hinge assembly of a truck bed extender of the present invention, with the primary panel folded against the interior surface of the vehicle tailgate for storage of the extender.
Figure 9B:
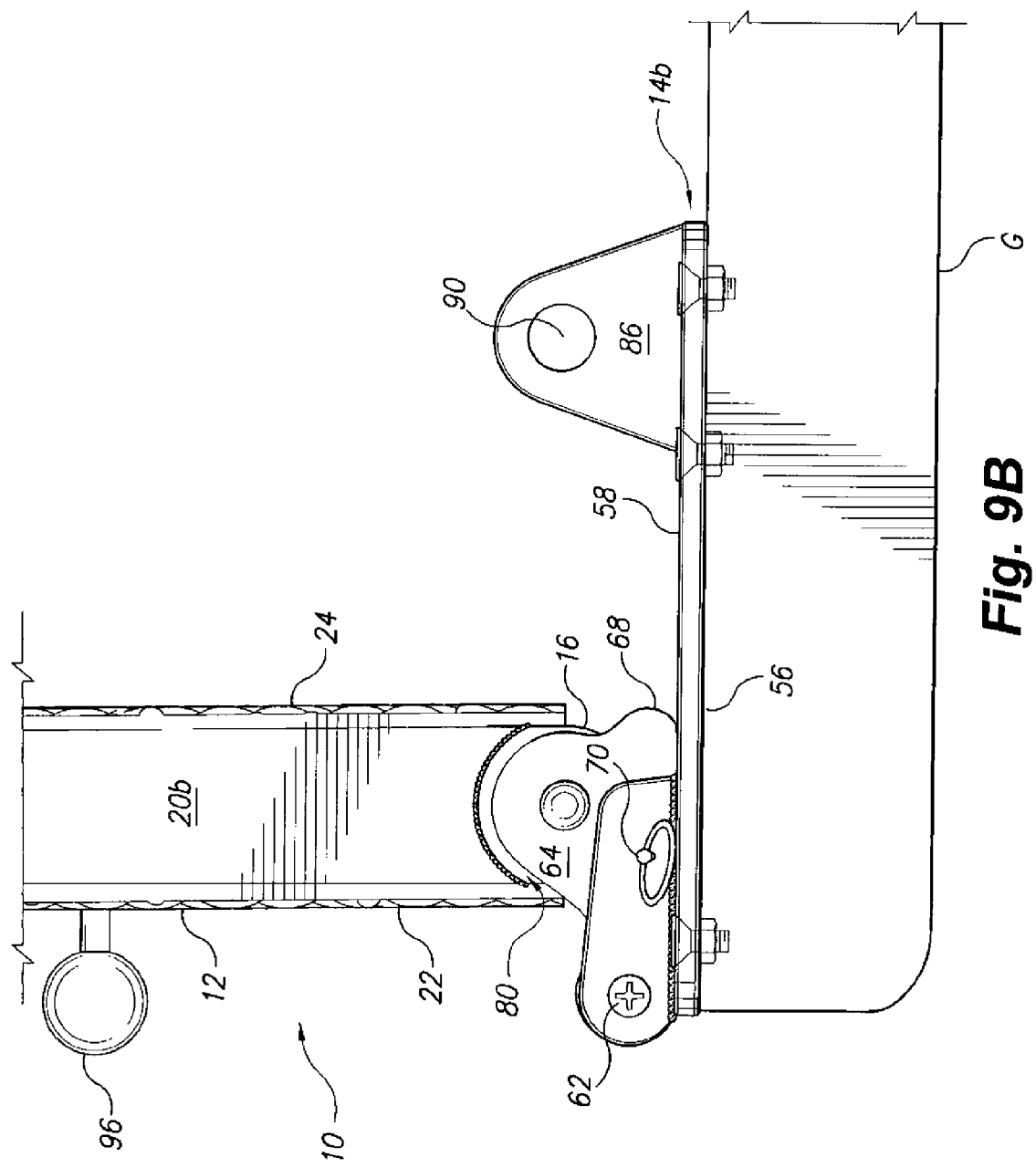
FIG. 9B is an environmental detail elevation view of a truck bed extender of the present invention, showing the right side primary panel hinge assembly of FIG. 9A with the extender primary panel deployed normal to the plane of the tailgate.
Figure 9C:
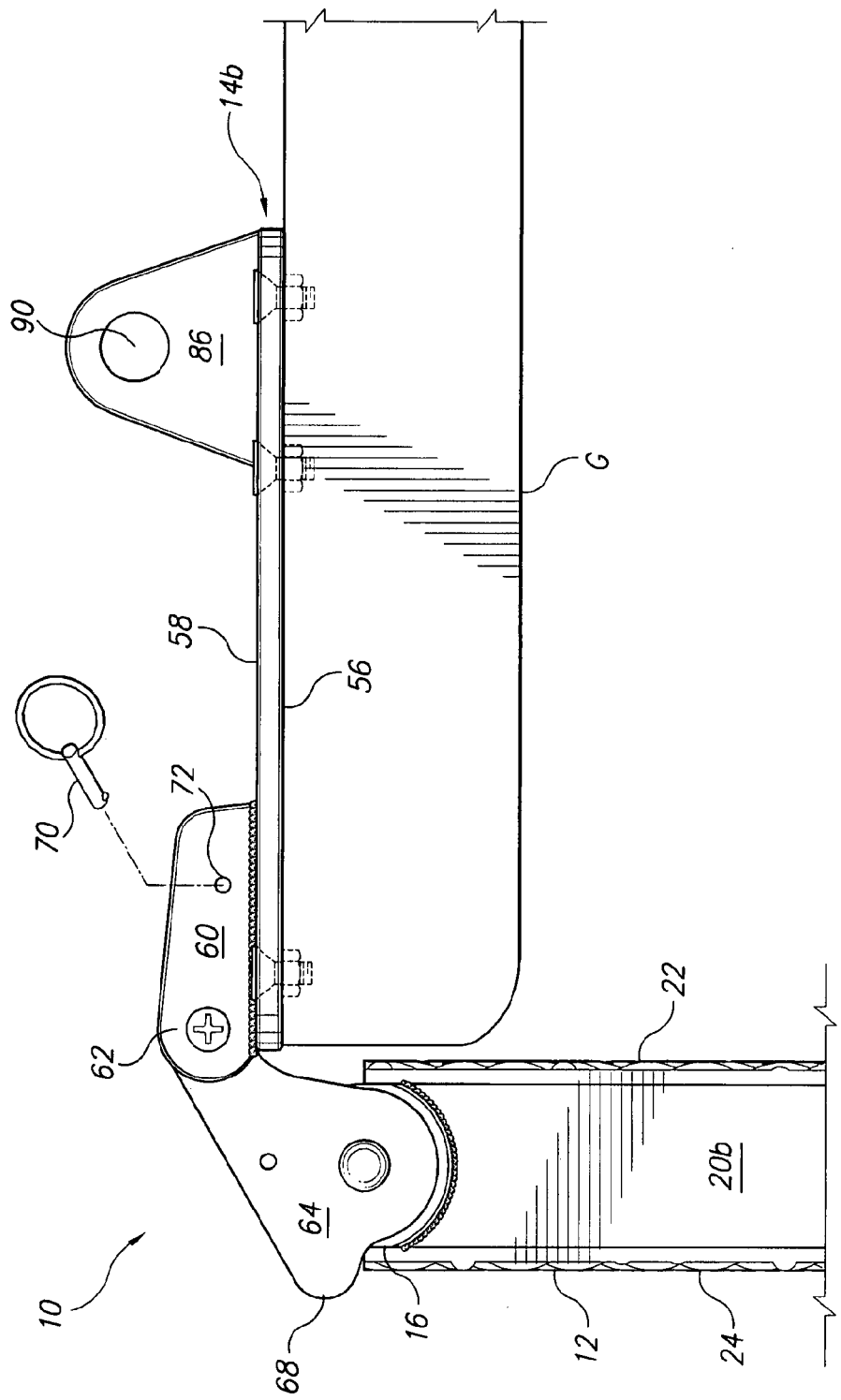
FIG. 9C is an environmental detail elevation view of a truck bed extender of the present invention, showing the right side primary panel hinge assembly of FIGS. 9A and 9B with the hinge fully extended and the extender depending from the lowered tailgate.
Figure 10:
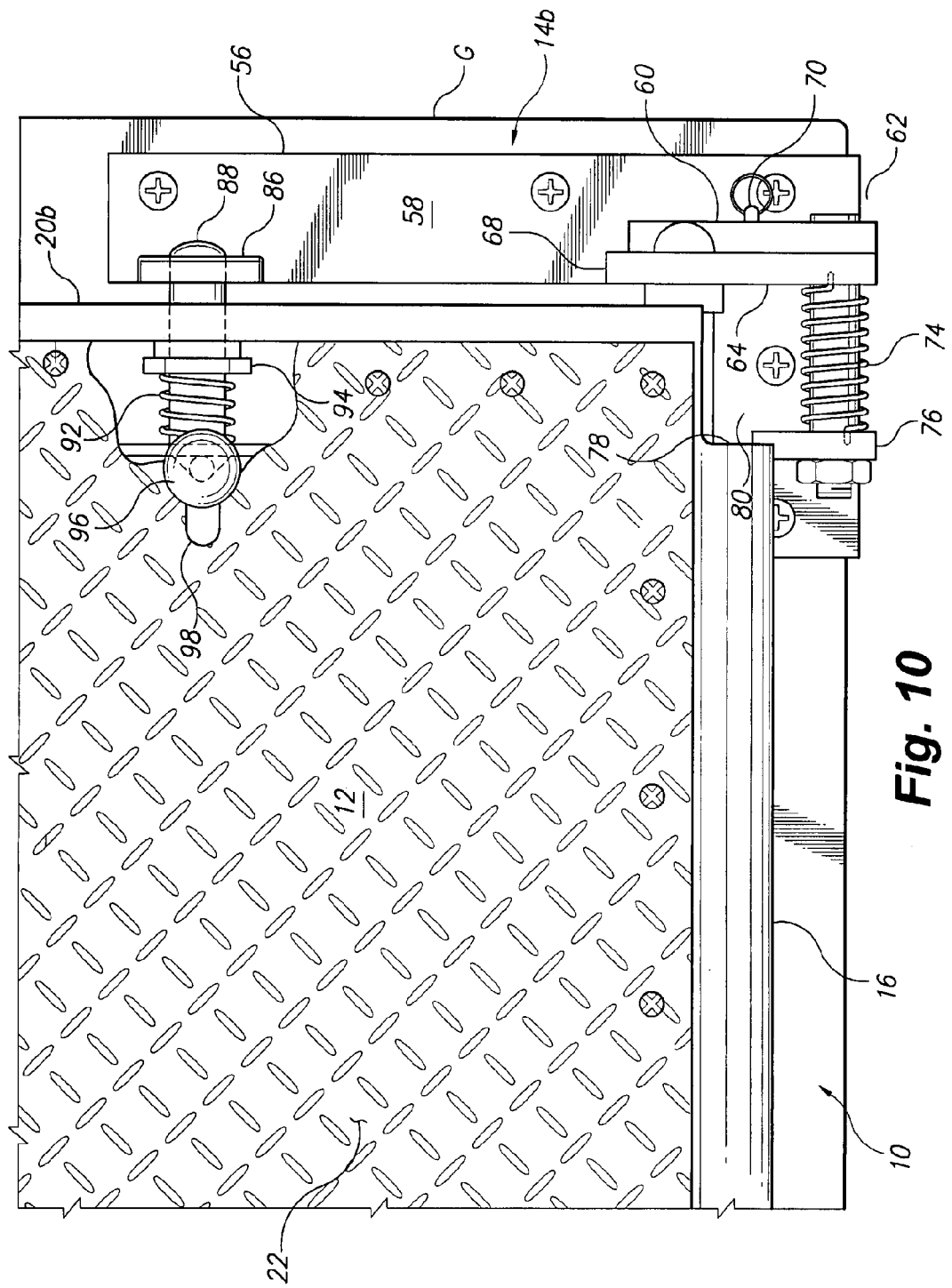
FIG. 10 is an environmental detail, broken away elevation view of a truck bed extender of the present invention, showing the right side primary panel hinge and primary panel latch assembly, including a hinge spring structure.

FIGS. 8 through 9C provide detailed illustrations of one of the articulating hinges used for the removable attachment of the primary panel 12 to the tailgate G of the vehicle, with FIG. 10 providing a top plan view of the articulating hinge assembly 14b. The hinge bracket assembly 14b comprises an extender panel attachment hinge bracket 56 having a tailgate attachment flange 58 and upstanding hinge lugs 60a and 60b. The hinge lugs 60a, 60b include a hinge pin or bolt 62 therethrough, which pivotally attaches an intermediate hinge link 64 therebetween and thus to the hinge bracket 56. The hinge link 64 has a hinge bracket attachment end 66 pivotally secured to the hinge bracket 56 by the hinge pin 62, with the opposite extender panel attachment end 68 of the hinge link 64 pivotally extending from the hinge bracket 56. The extender panel attachment end 68 comprises a protruding lug or ear with an extender panel hinge pin passage therethrough, permitting the extender panel hinge pin to be removably installed in the intermediate hinge link 64 of the hinge assembly 14b, which process is illustrated in FIG. 8 and discussed further below. An intermediate link locking pin 70 is selectively installed through passages 72 (FIG. 9C) in the hinge lugs 60a, 60b and intermediate hinge link 64, to limit articulation of the hinge assembly as desired. It will be seen that the opposite extender panel attachment hinge assembly 14a is similar to hinge assembly 14b, but without storage latch lug 86, described below.

A simpler, conventional single pivot hinge arrangement may be used if desired, but the double pivot articulating hinge bracket assembly 14a, 14b allows the primary panel 12 to swing through an arc of approximately 270 degrees while preventing the hinge structure from extending beyond the distal edge of the tailgate G when the primary panel 12 is retracted against the tailgate G. This allows a camper shell or the like to be installed atop the truck box walls LW and RW without interference from protruding hinge components, which would be necessary for a single pivot hinge positioned to allow the primary panel 12 to swing completely past a coplanar orientation with the gate G, as shown in FIG. 9C.

As shown in the embodiment of FIG. 10, a torsion spring 74 may optionally be installed upon the intermediate hinge pin or bolt 62 between the intermediate hinge link 64 and a secondary hinge pin lug or ear 76, if so desired. This torsion spring 74 urges the intermediate link 64 to its retracted position, as shown in FIGS. 8, 9A, 9B, and 10, when the primary panel 12 is raised to an upright position or stored against the tailgate G, thus making it easier for the user to raise and store the primary panel 12 and its side panels 26a and 26b.

FIG. 8 illustrates the means for removing the primary panel 12 and its two side panels 26a and 26b from the vehicle tailgate G. In the embodiment illustrated in FIG. 8, the hinge attachment edge 16 of the primary panel 12 comprises a tubular structure having a circular cross section. The right end 78 of the tubular hinge attachment edge 16 includes a semicircumferential hinge lug clearance relief 80 formed therein. The right end primary panel hinge pin 82b extends concentrically from the tubular hinge attachment edge 16 of the primary panel 12 and through the hinge lug clearance relief area 80, to engage the extender panel end portion 68 of the intermediate hinge link 64 of the primary panel hinge assembly 14b. The opposite end of the primary panel hinge attachment edge does not require the hinge lug clearance relief 80, but nay be configured similarly to the right end portion 78 of the primary panel hinge attachment edge 16, if so desired.

The above-described hinge edge structure for the primary panel 12 permits the panel 12 to be easily removed from its hinges 14a and 14b whenever such removal is desired, yet retains the panel in place between the hinges until the operator performs the precise manipulations required for removal. To remove the primary panel 12 and its side panel attachments 26a, 26b, the primary panel 12 is rotated from its stowed position (shown in solid lines in FIG. 8) to a raised position (shown in broken lines in FIG. 8) preferably somewhat beyond 90° to the underlying tailgate G. This aligns the hinge lug clearance relief slot or area 80 of the right end 78 of the hinge attachment edge 16 of the primary panel 12 with the protruding lug portion 68 of the intermediate link 64 of the hinge assembly 14b, allowing the primary panel 12 (and its attached side panels 26a, 26b) to slide axially to the right, with the right end primary panel hinge pin 82b passing further through the hinge pin passage of the intermediate hinge link 64.

As this occurs, the left end hinge pin 82a (shown particularly in FIGS. 5 and 6 of the drawings) is simultaneously withdrawn from its hinge pin passage, thus releasing the left end of the primary panel 12 from its attachment to the vehicle tailgate. The left end hinge pin 82a may then be lifted slightly to clear the left hinge structure 14a (the right side hinge pin passage may be enlarged slightly to allow for the angular misalignment of its hinge pin 82b as the left end of the panel 12 is lifted), and the primary panel 12 may be moved axially to the left to withdraw the right hand hinge pin 82b from its hinge structure 14b. A handhold 84 (shown in FIGS. 1-7) is provided in the upper center of the primary panel 12 to facilitate this and other operations of the extender assembly 10. Reinstallation of the primary panel 12 and its side panels 26a, 26b is accomplished by reversing the above procedure. It will be seen that the arcuate extensions of the right end 78 of the primary panel hinge attachment end 16, which extend to the primary panel right hand edge 20b, abut the inner face of the protruding lug or ear portion 68 of the intermediate hinge link 64 when the panel 12 is in any position other than essentially that shown in broken lines in FIG. 8. Thus, the primary panel 12 cannot move axially to any significant degree to allow the release of the left hand hinge pin 82a from its hinge assembly 14a unless the panel 12 is deliberately raised to an angle beyond its normal erected or deployed angle or position.

Figure 11:
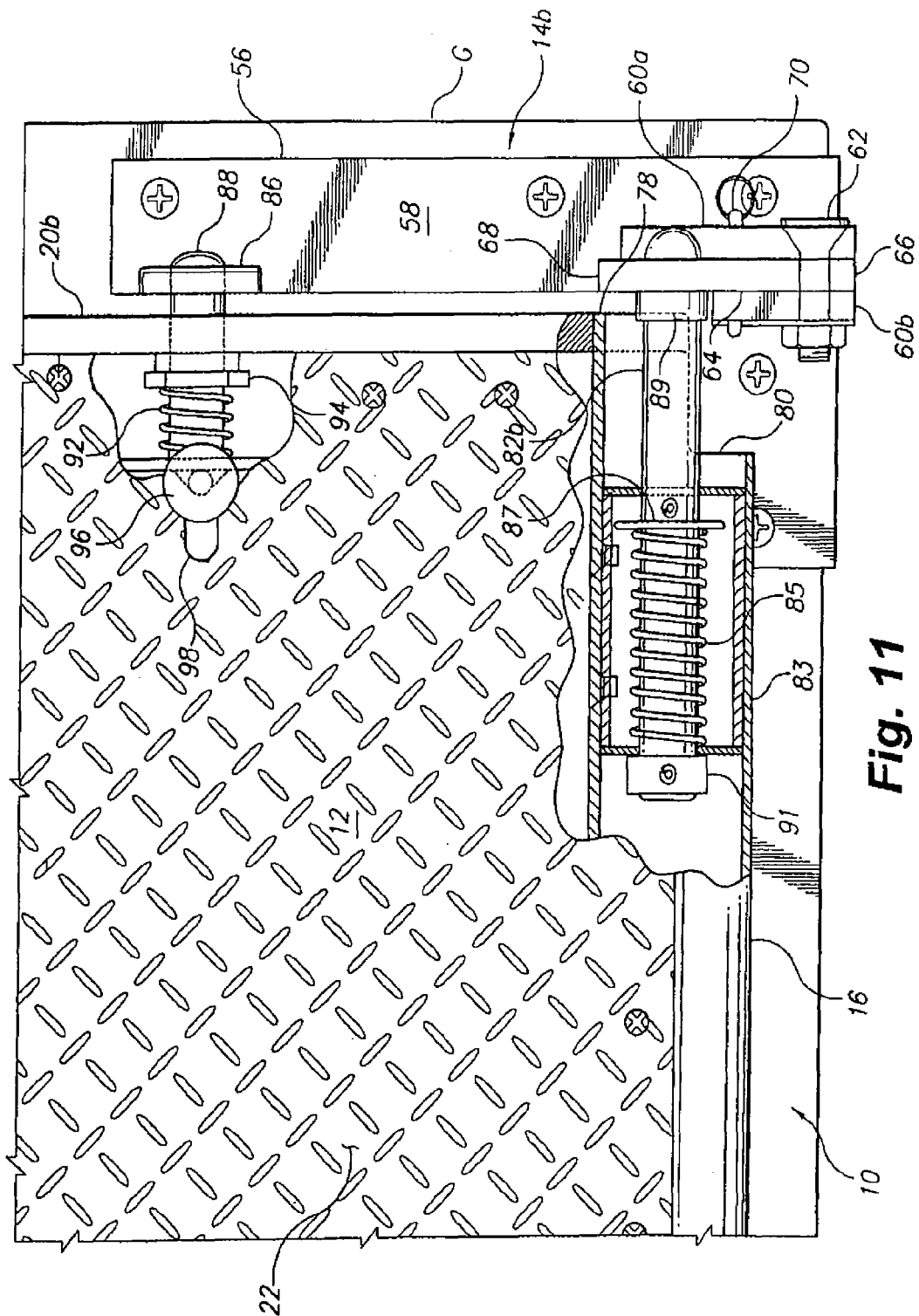
FIG. 11 is an environmental detail, broken away elevation view of a truck bed extender of the present invention showing the right side primary panel hinge and primary panel latch assembly, including the retractable hinge pin component.

The above-described procedure for removing and reinstalling the primary panel 12 and its attachments to the tailgate G of the vehicle indicates that the right side hinge pin 82b is immovably affixed within the hinge axis of the panel 12. However, a more preferred hinge pin embodiment is illustrated in FIG. 11 of the drawings, in which the right side hinge pin 82b is retractable along its hinge axis. In the embodiment of FIG. 11, the pin 82b extends and retracts from a concentric cylinder 83, which is, in turn, secured within the right end of the tubular attachment edge 16 of the primary panel 12. Screws, as shown or other fasteners may be used to secure the hinge pin cylinder 83 within the attachment edge tube 16. A hinge pin extension spring 85 is installed concentrically about the hinge pin 82b, with the spring 85 being compressed between the inboard end of the hinge pin cylinder 83 and a washer or collar and roll pin assembly 87 at the opposite end of the spring 85. A larger diameter collar 89 is installed near the distal end of the pin 82b, with the collar 89 abutting the inboard face of the articulating hinge link 64. Alternatively, the majority of the pin 82b may have a larger diameter than its distal end, with the shoulder defined by the differences in diameters providing the stop against the inboard face of the hinge link 64. This spring-loaded pin arrangement serves to reduce lateral play in the extender panel assembly, thus reducing rattle and noise during operation of the vehicle.

Removal of the primary panel 12 and its attachments is accomplished in essentially the same manner as described further above for the fixed hinge pin embodiment, i.e., by orienting the panel 12 to align the relief area 80 with the extender panel attachment end 68 of the hinge link 64 and sliding the panel 12 to the right. This causes the retractable pin 82b to retract within its cylinder 83 as the collar or shoulder 89 bears against the inboard face of the hinge link 64, and causes the spring 85 to compress as the pin 82b retracts. When the extender panel 12 has been moved sufficiently far to the right, the opposite left end hinge pin 82a clears its hinge link, permitting the extender panel 10 to be removed from the left side hinge assembly 14a. Moving the panel 12 slightly toward the left allows the pin 82b to extend as the spring 85 extends, with further leftward movement withdrawing the pin 82b from its hinge link to allow removal of the panel 12. An extension limit collar 91 is installed upon the left or inboard end of the retractable right side hinge pin 82b. Reinstallation of the panel 12 assembly is accomplished by reversing the above-described process, i.e., inserting the retractable pin 82b in its receptacle or passage in the hinge link 64 and pushing the panel 12 to the right to compress the spring 85 and retract the pin 82b, thus providing clearance at the opposite end of the panel 12 for the insertion of the opposite hinge pin 82a in its hinge link. The panel 12 may then be released, with the right hinge pin spring 85 expanding to extend its hinge pin 82b to push the panel 12 to the left to fully engage the left side hinge pin 82a.

The attached side panels 26a and 26b are positively latched in place to the primary panel 12 by means of the side panel retaining pin 41 and retaining pin hole 43 of FIGS. 2A and 2B when the tailgate G is raised and the primary panel 12 is folded downwardly to depend from the distal edge of the gate G, as shown in FIG. 7. However, it will be seen that the primary panel 12 may tend to swing forwardly during deceleration of the truck or vehicle T, and perhaps bang back and forth against the inner surface of the tailgate G. Accordingly, a lock or latch mechanism may be provided to hold the primary panel 12 (and underlying side panels 26a, 26b) securely against the tailgate G when the apparatus is folded.

FIGS. 10 and 11 provide detail views of the lock or latch mechanism used to secure the extender apparatus in its folded configuration against the vehicle tailgate G. An additional primary panel storage latch lug 86 may be provided, extending from the end of the tailgate attachment flange 58 of the extender panel hinge bracket assembly 14b opposite the hinge lug 60, 60a, or 60b thereof, depending upon the embodiment. (It will be noted that the right side panel 26b has a notch or recess 86b complementary to the shape of lug 86 formed along the bottom edge of the panel 26b, as seen in FIGS. 3 through 5, so that lug 86 does not impair pivoting side panel 26b outward over or above bracket 14b.) A primary panel storage latch pin 88 is installed laterally in the extender primary panel 12, aligned to engage the passage 90 (FIGS. 9B and 9C) through the latch lug 86 when the panel assembly is folded, as shown in FIGS. 6, 7, 8, and 9A A latch pin extension or compression spring 92 is installed concentrically about the shaft of the pin 88 and bears against a flange 94 on the shaft of the pin 88, biasing the pin 88 to an extended position from the primary panel 12 to engage the passage through the storage latch lug 86 when the extender panel assembly is in its folded or stored configuration. The distal end of the pin 88 may be tapered or angled, with the latch lug 86 acting as a striker to allow the assembly to latch automatically when the primary panel 12 is folded against the surface of the tailgate G. A release shaft with a distal knob 96 extends through a slot 98 in the outer surface 22 of the primary panel 12 to allow the operator to withdraw the pin 88 from its engagement through the latch lug 86 when extension of the extender panel assembly is desired. A conventional lock (e.g., padlock, etc., not shown) may be installed about the latch release shaft and/or knob 96 to prevent operation of the knob, thereby preventing an unauthorized party from pivoting the primary panel 12 to the position shown in broken lines in FIG. 8 and removing the extender panel assembly from the vehicle.

Although the truck bed extender 10 is shown in the drawings with a single storage latch pin 88 and lug 86, the extender may be provided with a symmetrical, mirror image structure on the opposite side of the extender 10, if desired.

Figure 12:
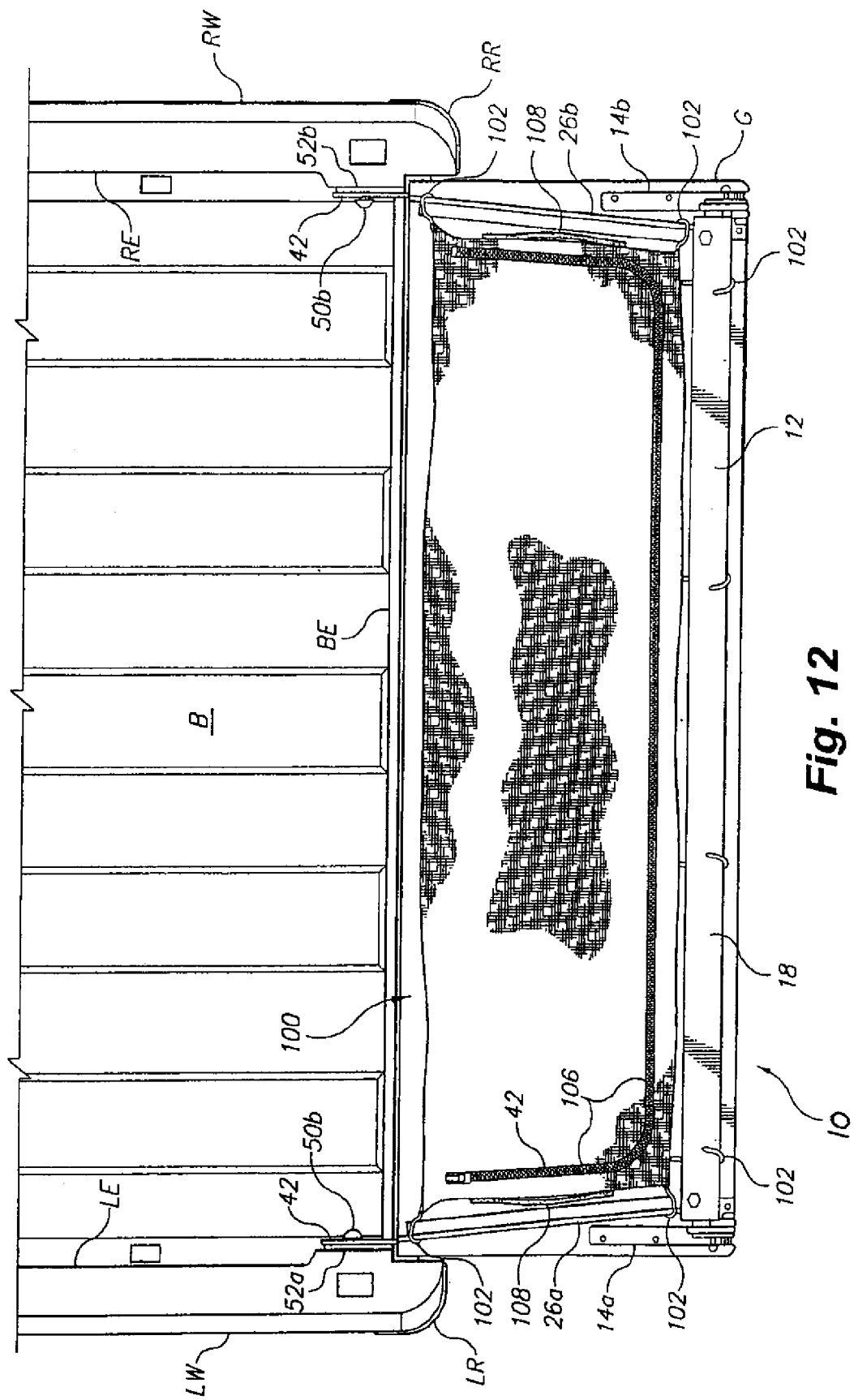
FIG. 12 is an environmental top plan view of a truck bed extender of the present invention with the vehicle tailgate extended and the truck bed extender deployed, showing an optional storage container removably secured thereto.

In some instances it may be desirable to provide enclosed storage space, e.g., to protect tools and equipment from the weather, etc. Various enclosed toolboxes, etc. are known that may be installed adjacent the forward end of the cargo bed of the vehicle. However, these units all encroach upon the remainder of the space or volume available in the cargo bed area of the vehicle, and none are suitable for use in a panel van, utility vehicle, station wagon, etc., due to the configuration of the unit and the vehicle. FIG. 12 provides a top plan view of a portable enclosure or storage compartment 100 for use with the truck bed extender 10, which may be removably secured to the primary panel 12 and side panels 26a, 26b by hooks 102 or other suitable fasteners. The hooks 102 engage a corresponding series of attachment passages 104 (shown in FIGS. 1, etc.) formed in the primary panel 12 and side panels 26a, 26b. In this manner, the operator of the vehicle T may enjoy the entire original volume of the cargo bed B of the vehicle, and still have additional enclosed storage volume for additional articles. The storage compartment 100 is preferably formed of a flexible material (e.g., canvas duck, or rubberized, waterproof fabric, plastic sheet material, etc.) to permit it to be folded for compact storage when not in use. A zipper 106 or other suitable closure means may be provided to close the top of the device. Handles 108 are provided at the opposite ends and/or other areas of the compartment 100 to facilitate handling the device, particularly when it contains various tools and articles.

In conclusion, the truck bed extender in its various embodiments enables the owner or operator of a light truck type vehicle or the like to substantially increase the cargo capacity of the vehicle as desired, while still being able to return the vehicle to its original external dimensions when the additional capacity is not required. The primary panel 12 of the bed extender assembly 10 may include further features in addition to those described above and illustrated in the drawings. For example, the primary panel 12 (and/or the side panels 26a and 26b) could be embellished with reflectors or reflective tape for better visibility in darkness or when visibility is obscured. Alternatively, electric lighting could be installed upon the primary panel and/or side panels, with the electric lighting connected to the taillights and brake lights of the vehicle upon which the extender is installed. Conventional quick disconnect fittings, as used for trailer lighting from the towing vehicle, could be incorporated to enable the extender assembly to be quickly installed upon and removed from the vehicle. Also, some form of padding or a protective edging may be applied to the upper or distal edge 18 of the primary panel 12, and/or to the upper edges of the two side panels 26a and 26b, if so desired, in order to protect the finish of these panels and/or any elongate articles having relatively fragile finishes which might be marred by contact with the edges of the panels. Accordingly, the truck bed extender in its various embodiments will prove to be a most attractive accessory for a large number of owners and operators of light trucks and similar vehicles which may take advantage of the device.

It is to be understood that the present invention is not limited to the embodiment(s) described above, but encompasses any and all embodiments within the scope of the following claims.

The invention claimed is:

1. A truck bed extender, comprising:
left and right hinge bracket assemblies adapted for attachment to a truck bed gate;

an extender primary panel pivotally and removably attached to the left and right hinge bracket assemblies, the extender primary panel having a hinge attachment edge, at least one end of the hinge attachment edge of said primary panel has a semicircumferential hinge lug clearance relief formed therein, a distal edge opposite the hinge attachment edge, a left edge, a right edge opposite the left edge, an outer surface, and an inner surface opposite the outer surface, said hinge bracket assembly further comprises a protruding lug extending therefrom, the protruding lug selectively aligning with the hinge lug clearance relief of said primary panel in accordance with rotation of said primary panel relative to said hinge bracket assemblies, said primary panel further comprises a left end hinge pin and a right end hinge pin extending concentrically from the hinge attachment edge at the left and right edges of said primary panel, whereby axial movement of said primary panel disengages the left end hinge pin from the protruding lug of a corresponding said hinge bracket assembly and subsequent withdrawal of the first pin from the protruding lug of said corresponding hinge bracket assembly permits removal of said primary panel from said hinge bracket assemblies;

a left side panel and a right side panel, each of the side panels having a primary panel attachment edge pivotally attached to the left and right edges, respectively, of the extender primary panel, each of the side panels having a distal edge opposite the primary panel attachment edge, an outer surface, and an inner surface opposite the outer surface;

a left bed sidewall latch plate extending from the left side panel and a right bed sidewall latch plate extending from the right side panel beyond the distal edges thereof; and a left latch assembly and a right latch assembly adapted for attachment to left and right sidewalls of the truck bed, respectively, the sidewall latch plates releasably latching to the left and right latch assemblies.

2. The truck bed extender according to claim 1, wherein each said hinge bracket assembly further comprises:
   a bracket; and
   an intermediate hinge link pivotally extending from the bracket, the intermediate hinge link having a bracket attachment end and an extender panel attachment end opposite the bracket attachment end thereof.

3. The truck bed extender according to claim 1, further including:
   a hinge attachment edge hinge pin and a distal edge hinge pin opposite thereto extending from the primary panel attachment edge of each said side panel, respectively, the hinge pins pivotally engaging the hinge attachment edge and distal edge of the extender primary panel; and
   a compression spring disposed concentrically upon one of the hinge pins of each said side panel between the side panel and the corresponding edge of the primary panel, bearing against the corresponding edge of the primary panel, the spring biasing the extender side panel toward the opposite edge of the primary panel and biasing the sidewall latch plate of the side panel into engagement with the corresponding latch assembly.

4. The truck bed extender according to claim 1, wherein each said latch plate has at least one latch pin engagement passage therethrough, the latch pin engagement passage having a large diameter portion and a narrow slot extending therefrom, said latch assembly comprising at least one latch pin adapted for extension from each of the sidewalls of the truck bed, the latch pins having a narrow shank and a large diameter head, the large diameter portion of the latch pin engagement passage passing over the head of the latch pin and the narrow slot passing about the narrow shank of the latch pin to latch the sidewall latch plates of the corresponding latch pin.

5. The truck bed extender according to claim 1, wherein one of said hinge bracket assemblies further comprises a storage latch lug protruding therefrom, the truck bed extender further comprising:
   a storage latch pin extendable laterally from one of the ends of said primary panel, the storage latch pin selectively engaging the storage latch lug; and
   a compression spring disposed concentrically about the storage latch pin, the spring biasing the storage latch pin into engagement with the storage latch lug.

6. The truck bed extender according to claim 1, further including a storage compartment removably attached to the primary panel and to each said side panel.

7. A truck bed extender, comprising:
   mutually opposed first and second hinge brackets adapted for attachment to a truck bed gate;
   an intermediate hinge link pivotally extending from each of the hinge brackets, each of the intermediate hinge links having a hinge bracket attachment end and an extender panel attachment end opposite the hinge bracket attachment end thereof;
   a primary panel pivotally and removably secured between the extender panel attachment ends of the intermediate hinge links, the primary panel having a hinge attachment edge, a distal edge opposite the hinge attachment edge, a left edge, a right edge opposite the left edge, an outer surface, and an inner surface opposite the outer surface, at least one end of the hinge attachment edge of said primary panel has a semicircumferential hinge lug clearance relief formed therein, each of said hinge brackets further comprises a protruding lug extending therefrom, the protruding lug selectively aligning with the hinge lug clearance relief of said primary panel in accordance with rotation of said primary panel relative to said hinge brackets, said primary panel further comprises a left end hinge pin and a right end hinge pin extending concentrically from the hinge attachment edge at the left and right edges of said primary panel, whereby axial movement of said primary panel disengages the left end hinge pin from the protruding lug of a corresponding said hinge bracket and subsequent withdrawal of the first pin from the protruding lug of said corresponding hinge bracket permits removal of said primary panel from said hinge brackets; and
   a left side panel and a right side panel, each of the side panels having a primary panel attachment edge pivotally attached to the left edge and the right edge of the extender primary panel, respectively, the side panels having a distal edge opposite the primary panel attachment edge, an outer surface, and an inner surface opposite the outer surface.

8. The truck bed extender according to claim 7, further comprising:
   a left bed sidewall latch plate extending from the left side panel and a right bed sidewall latch plate extending from the right side panel beyond the distal edges thereof; and
   a left latch assembly and a right latch assembly adapted for attachment to left and right sidewalls of the truck bed, respectively, the sidewall latch plates releasably latching to the left and right latch assemblies.

9. The truck bed extender according to claim 7, further including:

a hinge attachment edge hinge pin and a distal edge hinge pin opposite thereto extending from the primary panel attachment edge of each said side panel, respectively, the hinge pins pivotally engaging the hinge attachment edge and distal edge of the extender primary panel; and a compression spring disposed concentrically upon one of the hinge pins of each said side panel between the side panel and the corresponding edge of the primary panel, bearing against the corresponding edge of the primary panel, the spring biasing the extender side panel toward the opposite edge of the primary panel and biasing the sidewall latch plate of the side panel into engagement with the corresponding latch assembly.

10. The truck bed extender according to claim 7, further including:

a left bed sidewall latch plate extending from the left side panel and a right bed sidewall latch plate extending from the right side panel beyond the distal edges thereof; and a left latch assembly and a right latch assembly adapted for attachment to left and right sidewalls of the truck bed, respectively, the sidewall latch plates releasably latching to the left and right latch assemblies, wherein:

each said latch plate has at least one latch pin engagement passage therethrough, the latch pin engagement passage having a large diameter portion and a narrow slot extending therefrom, each said latch assembly comprising at least one latch pin adapted for extension from each of the sidewalls of the truck bed, the latch pin having a narrow shank and a large diameter head, the large diameter portion of the latch pin engagement passage passing over the head of the latch pin and the narrow slot passing about the narrow shank of the latch pin to latch the sidewall latch plates of the corresponding latch pin.

11. The truck bed extender according to claim 7, wherein one of said hinge brackets further comprises a storage latch lug protruding therefrom, the truck bed extender further comprising:

a storage latch pin extendable laterally from one of the ends of said primary panel, the storage latch pin selectively engaging the storage latch lug; and a compression spring disposed concentrically about the storage latch pin, the spring biasing the storage latch pin into engagement with the storage latch lug.

12. The truck bed extender according to claim 7, further including a storage compartment removably attached to the primary panel and to each of the side panels.

* * * * *